(12) United States Patent
Betesh

(10) Patent No.: US 12,345,958 B2
(45) Date of Patent: Jul. 1, 2025

(54) QUADRUPED OPTICAL SYSTEM

(71) Applicant: Eliot Betesh, Allenhurst, NJ (US)

(72) Inventor: Eliot Betesh, Allenhurst, NJ (US)

(73) Assignee: Pose Pets LLC, Brooklyn, NY (US)

( * ) Notice: Subject to any disclaimer, the term of this patent is extended or adjusted under 35 U.S.C. 154(b) by 0 days.

(21) Appl. No.: 18/540,869

(22) Filed: Dec. 15, 2023

(65) Prior Publication Data

US 2024/0201513 A1    Jun. 20, 2024

Related U.S. Application Data

(60) Provisional application No. 63/432,732, filed on Dec. 15, 2022.

(51) Int. Cl.
  *G02C 5/00*  (2006.01)
  *G02C 3/00*  (2006.01)

(52) U.S. Cl.
  CPC .............. *G02C 3/003* (2013.01); *G02C 5/001* (2013.01); *G02C 5/008* (2013.01)

(58) Field of Classification Search
  CPC ......... G02C 3/003; G02C 5/001; G02C 5/008
  See application file for complete search history.

(56) References Cited

U.S. PATENT DOCUMENTS

| | | | | |
|---|---|---|---|---|
| 3,873,192 A | * | 3/1975 | Anderson ................ | G02C 5/20 351/118 |
| 4,153,348 A | * | 5/1979 | Walters .................... | G02C 5/20 351/119 |
| 5,488,441 A | * | 1/1996 | Pomatti ................... | G02C 3/003 2/452 |
| 5,868,104 A | * | 2/1999 | Ramirez ............... | A01K 13/006 119/850 |
| D590,009 S | * | 4/2009 | Lane ............................. | D16/311 |
| 8,025,396 B1 | * | 9/2011 | Power ...................... | G02C 5/02 351/124 |
| 11,576,347 B1 | * | 2/2023 | Pavlicek ............... | A01K 13/006 |
| 11,693,256 B1 | * | 7/2023 | Hebert .................... | G02C 3/003 351/156 |
| 2005/0280772 A1 | * | 12/2005 | Hammock ........... | G02C 5/2263 351/118 |
| 2020/0089022 A1 | * | 3/2020 | Jouard .................... | G02C 5/045 |

FOREIGN PATENT DOCUMENTS

| | | |
|---|---|---|
| CN | 201917722 U | 8/2011 |
| DE | 10127953 A1 | 1/2003 |
| KR | 200335438 | 12/2003 |

OTHER PUBLICATIONS

Apr. 16, 2024 International Search Report and Written Opinion in PCT/US2023/084151.
Apr. 16, 2024 Search Strategy for ISR and Written Opinion in PCT/US2023/084151.

* cited by examiner

*Primary Examiner* — Tuyen Tra
(74) *Attorney, Agent, or Firm* — Joseph Farco

(57) ABSTRACT

A quadruped optical system comprises a frame configured to be worn by the quadruped and intersects its line of sight, a pair of temples coupled to the frame, and a saddle coupled to the pair of temples via a harness.

9 Claims, 4 Drawing Sheets

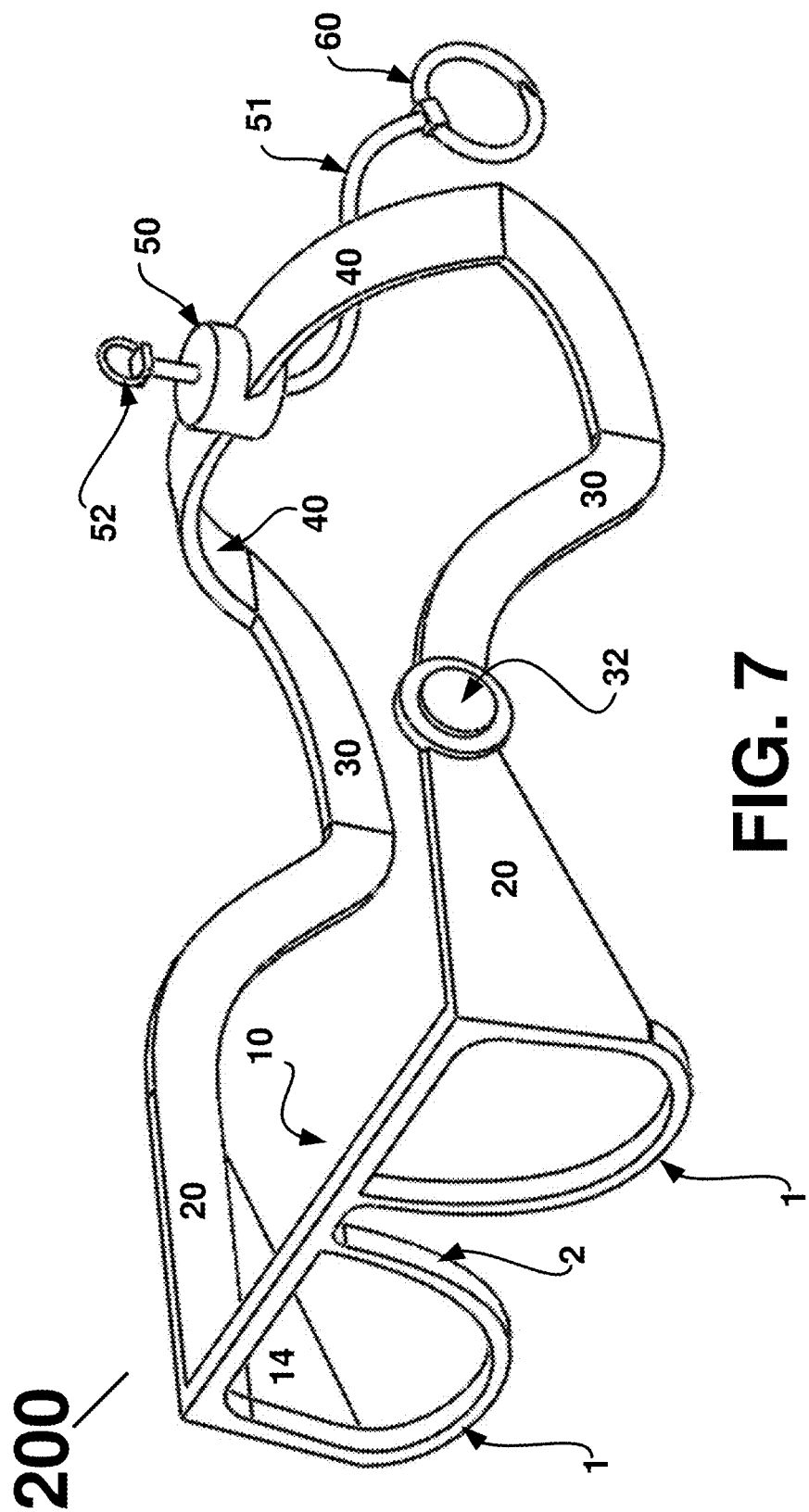

QUADRUPED OPTICAL SYSTEM

RELATED APPLICATIONS

This application claims the benefit of priority of U.S. Provisional Patent Application Ser. No. 63/432,732, filed on Dec. 15, 2022, the disclosures of which are incorporated herein by reference in their entirety.

FIELD OF THE INVENTION

Disclosed are embodiments of the invention that relate to, among other things, optical systems for quadrupeds, such as, for example, dogs, cats, horses, and livestock.

SUMMARY OF THE INVENTION

An exemplary quadruped optical system may have a frame configured to be worn by the quadruped so that it intersects its line of sight, a pair of temples coupled to the frame, and a saddle coupled to the pair of temples via a harness.

An exemplary quadruped optical system previously described may also have a saddle coupled to the pair of temples via a harness.

An exemplary quadruped optical system like any of the ones previously described may also have a lens in the frame.

An exemplary quadruped optical system like any of the ones previously described may also have a tether coupled to the saddle.

An exemplary quadruped optical system like any of the ones previously described may also have a tether coupled to the saddle, the tether having at least one latch coupled thereto.

An exemplary quadruped optical system like any of the ones previously described may also have a lens in the frame, a tether coupled to the saddle, and at least one latch coupled to the tether.

An exemplary quadruped optical system like any of the ones previously described may be configured so that at least one of the pair of temples is adjustable.

An exemplary quadruped optical system like any of the ones previously described may be configured so that an angle between the pair of temples and the harness is adjustable.

An exemplary quadruped optical system like any of the ones previously described may be configured so that a length of the pair of temples is adjustable.

An exemplary quadruped optical system like any of the ones previously described may be configured so that a length of the pair of temples is adjustable.

An exemplary quadruped optical system like any of the ones previously described may be configured so that the frame is made from the same material as the temples, the harness, and the saddle.

An exemplary quadruped optical system like any of the ones previously described may be configured so that the frame is made from plastic.

An exemplary quadruped optical system like any of the ones previously described may be configured so that the frame is made from a material that is different from the material used in either of the temples, the harness, or the saddle.

An exemplary quadruped optical system like any of the ones previously described may be configured so that the saddle is made of plastic.

An exemplary quadruped optical system like any of the ones previously described may be configured so that the saddle is configured to be coupled to another accessory or body part of the quadruped via a tether.

An exemplary quadruped optical system like any of the ones previously described may be configured so that the tether is configured to be coupled to the other accessory or body part of the quadruped using a latch.

An exemplary quadruped optical system like any of the ones previously described may be configured so that the other accessory is a dog collar.

An exemplary quadruped optical system like any of the ones previously described may be configured so that the other accessory is a cat collar.

An exemplary quadruped optical system like any of the ones previously described may be configured so that the other accessory is a vestige for a quadruped.

An exemplary quadruped optical system like any of the ones previously described may be configured so that the other body part is a horn.

In another exemplary quadruped optical system, there may be a frame configured to be located proximal to the eyes of a quadruped, and a saddle coupled to the frame, the saddle configured to lay atop the neck of the quadruped.

BRIEF DESCRIPTION OF THE DRAWINGS

FIG. 7 illustrates yet another exemplary embodiment of a quadruped optical system.

Figure 1:
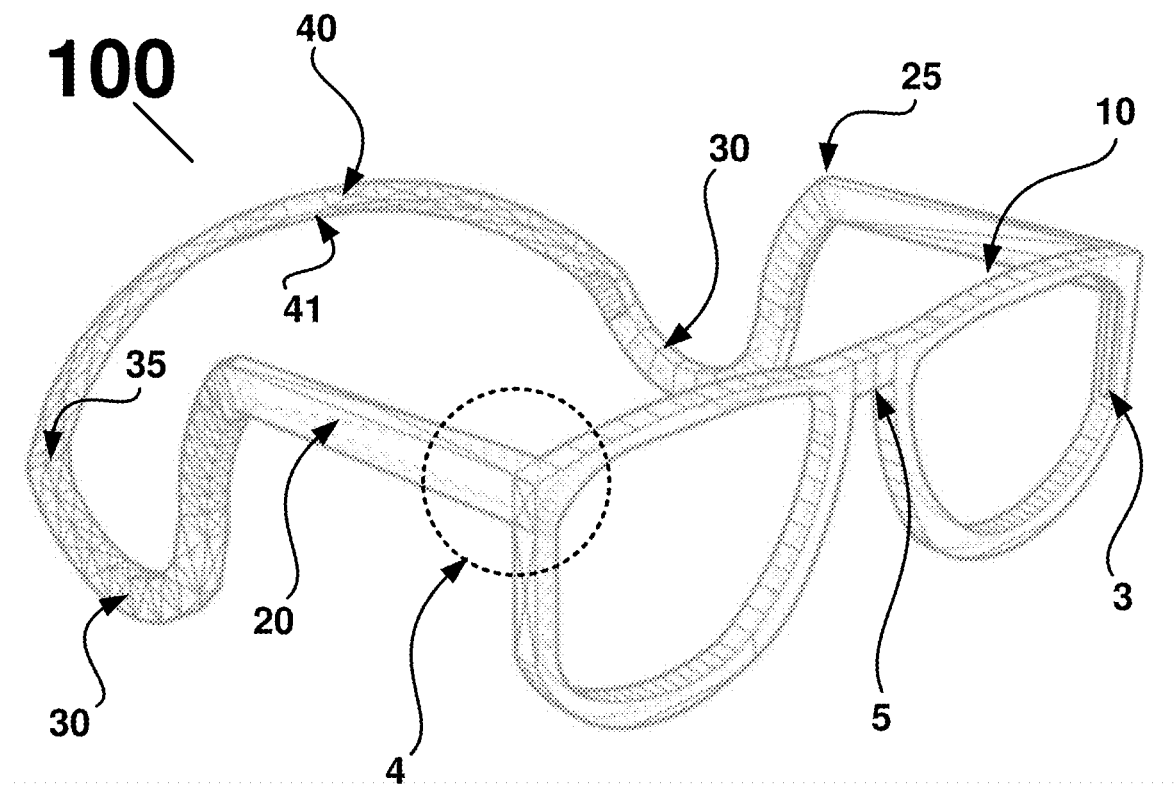
FIGS. 1-5 illustrate isometric, topographic, side, and rear views of an exemplary quadruped optical system.
Figure 2:
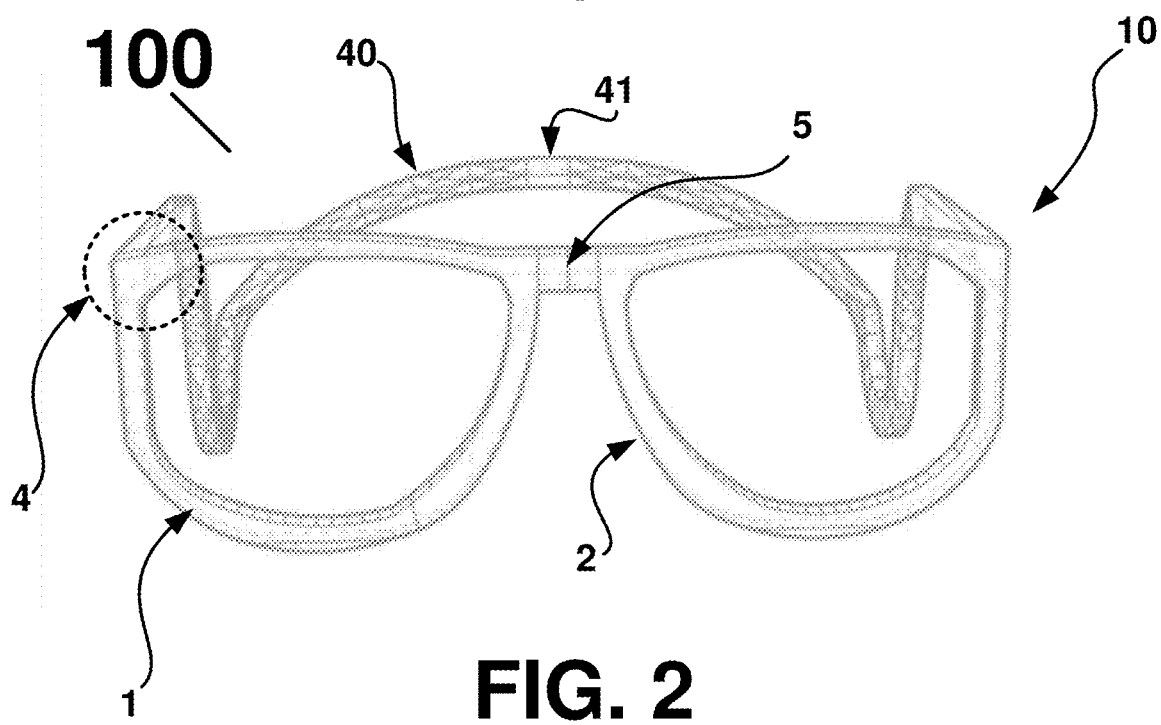
Figure 3:
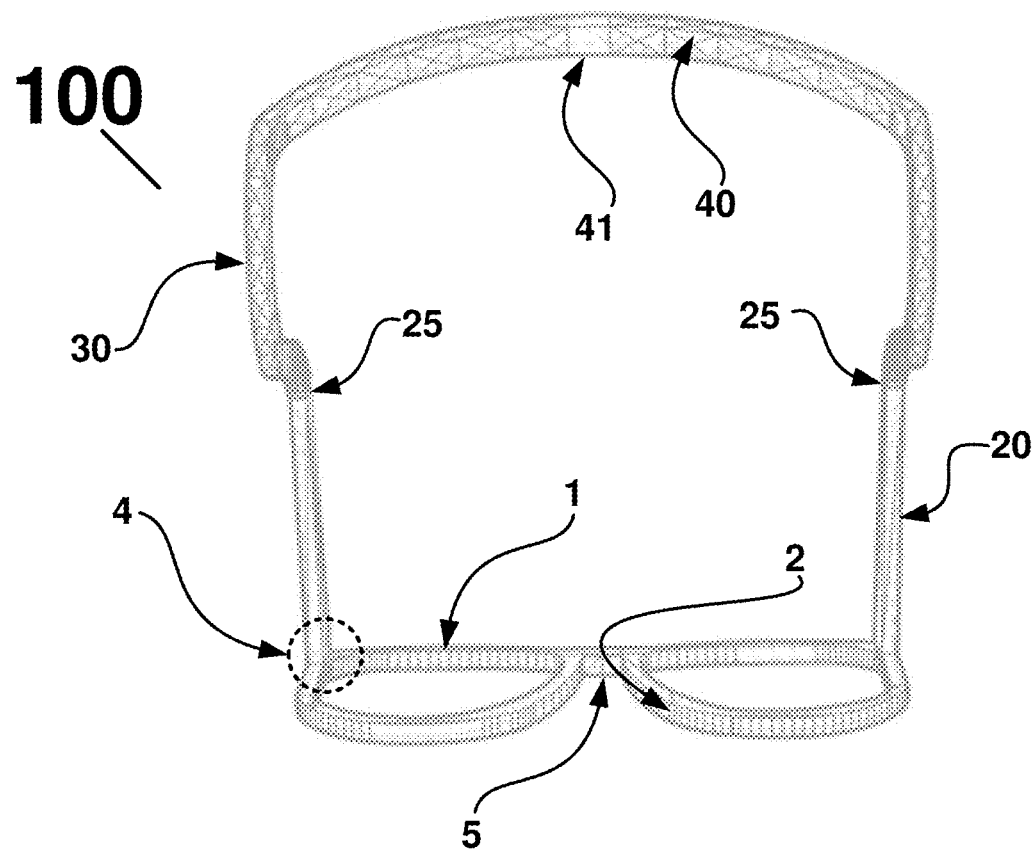
Figure 4:
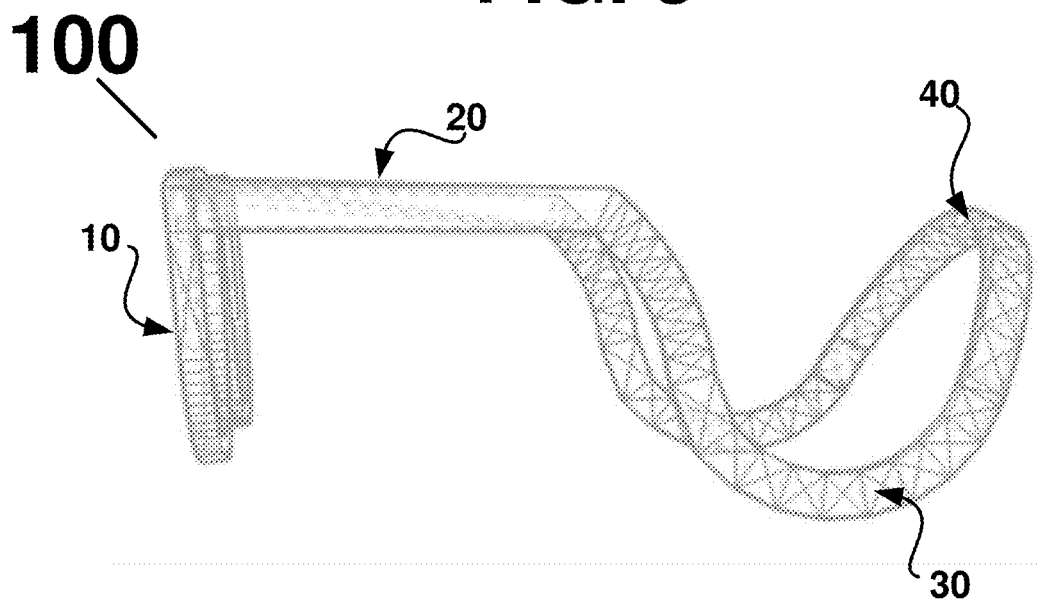
Figure 5:
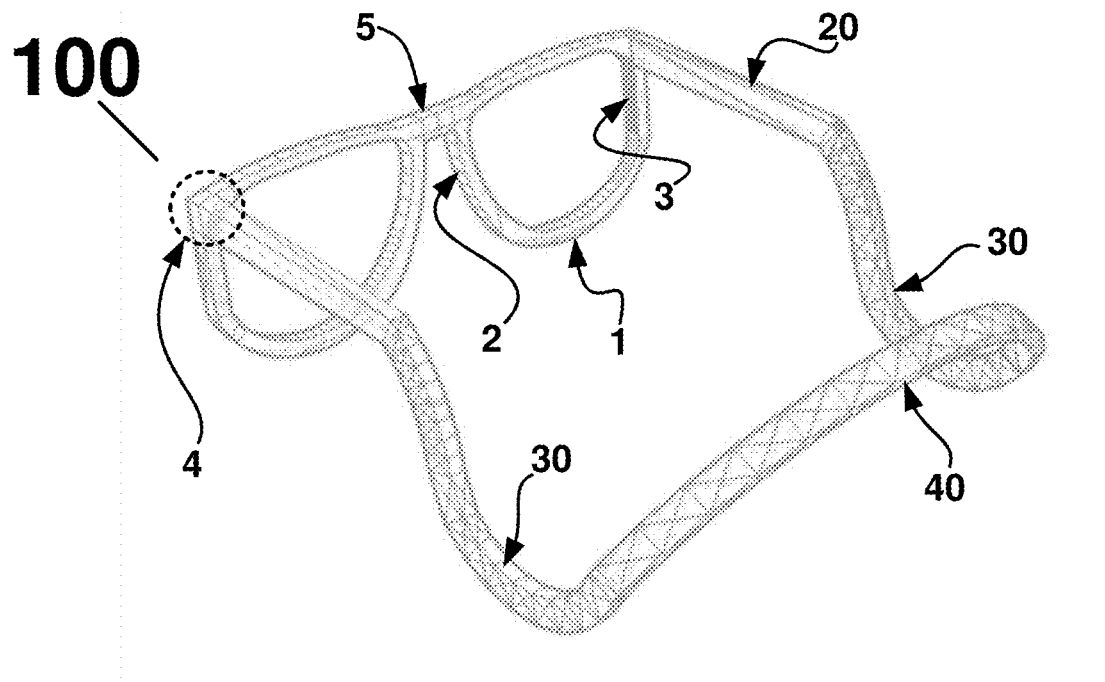

In the drawings like characters of reference indicate corresponding parts in the different figures. The drawing figures, elements and other depictions should be understood as being interchangeable and may be combined in any like manner in accordance with the disclosures and objectives recited herein.

DETAILED DESCRIPTION

An exemplary quadruped optical system ("QOS") 100 may be illustrated in FIGS. 1, 2, 3, 4, and 5. An exemplary QOS 100 may comprise an optical frame 10 made up of a major rim 1, a minor rim 2, a fitting crevice 3 located within one or both of the minor and/or major rims 1/2, a bridge 5, and a junction 4 for connecting the optical frame 10 to a temple 20. An exemplary junction 4 may be a hinged joint, a ball-and-socket joint, a rigid joint made up of two pieces of materially integrally molded into one another in an angular arrangement, a mechanically-attached coupling of two pieces of material (either the same material or different materials), fabric attachments such as buttons, zippers, Velcro®, or knitted arrangements, and any other attachments known to those skilled in the art.

QOS 100 may also comprise a joint 25 coupling the temple 20 to a saddle 40 via harness 30 and wrist 35. An exemplary temple 20 may have numerous formations depending on needs. An exemplary joint 25 may have numerous formations depending on needs. Either of joint 25, harness 30, and/or wrist 35 may be coupled to any other component in QOS 100 using the exemplary attachments as suitable for junction 4, including those known to the skilled artisan. An exemplary saddle 40 may be configured to rest snuggly atop the neck of a quadruped to enable the wearing of the frame 10. An exemplary frame 10 may be proximal to the eyes of the quadruped and/or intersect with the quadruped's line of sight. An exemplary saddle 40 may also have a slit, groove, or other form of connect-disconnect device that allows the saddle 40 to fold in upon itself. In one example, the saddle 40 may be divided at point 41 so that the two coupling ends adhere using Velcro®, magnets, snaps, or other mechanical adhesive or coupling techniques known to those skilled in the art. In all folding embodiments, bridge 5 may be flexible, resilient, or also capable of detachment to allow for the folding of the QOS 100.

All parts of QOS 100 may be made from any material suitable for holding lenses or appearing as eyeglasses/sunglass with or without lenses. In an exemplary embodiment all components of QOS 100 may be made from plastics, elastomers, metals, leather, fabric, or combinations of the same. In a preferred embodiment, an exemplary QOS 100 may be made from metals, leather, fabric, plastics, and other synthetic polymers.

In an exemplary QOS 100, an exemplary lens crevice 3 may accommodate one or more types of optical lenses (not shown) to aid the quadruped that wears the QOS 100 in having an enhanced visibility there through. For example, crevice 3 may be sized to fit a particular lens that may provide eye protection from the sun for a quadruped that is outside most of the day. Alternatively, crevice 3 may be a mechanical attachment point for setting the lens into rim 1, e.g., set screws, regular screws, or a support (not shown) that fits into place on the user-facing side of frame 10. While crevice 3 may be shown in major rim 1, it may equally be found in minor rim 2. Furthermore, minor rim 2 may, in an exemplary embodiment, be the portion of the frame 10 most adjacent to bridge 5, which may vary in size depending on what quadruped is meant to wear the QOS 100.

Figure 6:
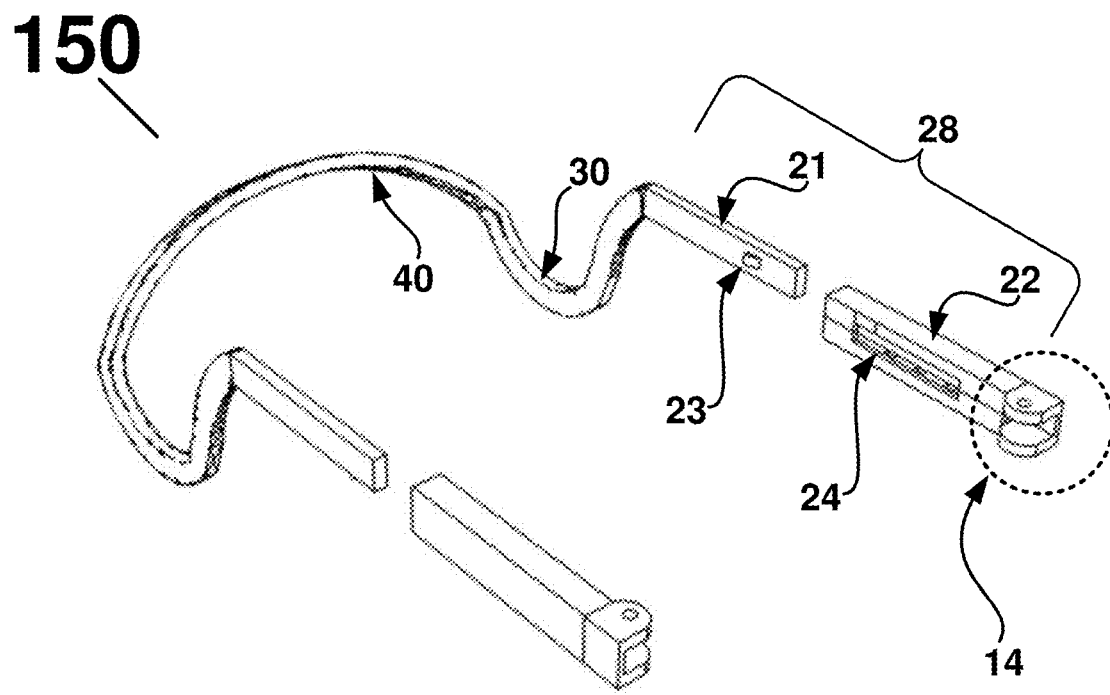
FIG. 6 illustrates another exemplary embodiment of a quadruped optical system.

In an alternative embodiment illustratively provided for in FIG. 6, an exemplary saddle 40 and harness 30 may be coupled to frame 10 via an adjustable temple 28 comprised of a slider 21 having a ridge or fitting 23 and tube 22 with slot 24. An exemplary ridge 23 and slot 24 may be a type of snap-fit arrangement, a threaded connection (e.g., like a screw), or a ratchet-like attachment. In each of the various adjustable temple 28 embodiments contemplated by these disclosures, a coupling such as hinge 14 may be used, although junction 4 may be equally suitable. According to this exemplary embodiment, the part of the adjustable temple 20 that couples to harness 30 may be integrally molded, sonic welded, or otherwise adhered thereto using any one of the aforementioned methodologies. An adjustable temple 28 may be advantageous for those uses of QOS 150 that may require form fitting to a particular quadruped. Alternatively, QOS 100 may be utilized with a frame 100, temple 20, harness 30, and/or saddle 40 with a bendable, posable wire embedded therein to maximize the size, appearance, and fit of the frame 100 on the quadruped.

FIG. 7 may illustratively provide for another exemplary embodiment of a QOS, only this QOS 200 may comprise additional features not present in the prior embodiments. QOS 200 may comprise a fascia-type-joint 14 for increasing surface area on temple 20. Additionally, an adjustment mechanism 32 may be used to articulate the angle at which temple 20 is oriented with respect to harness 30, such as, for example, a ratcheting wheel type adjustment, a screw-tightening fastener, or a pull-out/push-in locking dial to allow temple 20 to be rotated at a greater (or lesser) angle with respect to the harness 30 and/or saddle 40. While illustrated on only one side of the QOS 200, it may be expected that adjustment mechanism 32 may be located on the opposite temple 20 as well. With further reference to FIG. 7, an exemplary saddle 40 may also have an anchor 50 located along its length, an exemplary anchor 50 being either integrally molded into saddle 40 material or being mechanically attached or sewn, depending on needs. Anchor 50 may have a tether 51 coupling a reclosable/lockable latch 60, which may be used to tether harness 30 to an exemplary collar, tag, bridle, or other pre-existing attachments used for quadrupeds in practice and known to those skilled in the art. For example, an exemplary latch 60 may allow the saddle 40 to be tightly coupled to a dog or cat collar during use. Alternatively, latch 60 may couple saddle 40 to the bridle or head mounts on a horse. Further alternatively, latch 60 may be used to latch onto the horns of a cow. In each of these scenarios, an exemplary QOS 200 may be made to be secure on the quadruped based on a combination of saddle 40 and the elasticity and strength of tether 51/latch 60. In another aspect of this exemplary embodiment, tether 51 may be adjusted in terms of length via a key 52, that may be coupled to anchor 50 and receiving within it at least a portion of tether 51. As illustrated, an exemplary key 52 may also have its own coupling surfaces for additional tethers 51 between QOS 200 and the quadruped.

Any of exemplary QOS 100, 150, and 200 may be dissected and its components 10, 20, 28, 30, 40, 50, and/or 60 and their sub-components 1, 2, 3, 4, 5, 21-25, 32, 35, and/or 51-52 may be combined in one or more ways to achieve particular needs of a particular quadruped. For example, while fascia 14 of QOS 200 may serve as blinders for a horse, the may be restrictive for a feline quadruped, in which case they can be altered for viewing enhancement, made transparent, or completely removed. Additionally, while some frames 10 may contain lenses, other frames 10 may have no such lens and serve only as an aesthetic for the particular quadruped. In a still further embodiment, adjustment mechanism 32 may be programmable to allow the frame 10 to rotate from a position atop the quadruped's head to a position in front of the quadruped's face depending on conditions, e.g., high winds, large amount of sunlight, dust, debris, snow, rain, or any other form of environmental discomfort for the quadruped.

Many further variations and modifications may suggest themselves to those skilled in art upon making reference to above disclosure and foregoing illustrative and interrelated and interchangeable embodiments, which are given by way of example only, and are not intended to limit the scope and spirit of the interrelated embodiments of the invention described herein.

The invention claimed is:

1. A quadruped optical system, comprising:
    a frame configured to be worn by the quadruped and intersects its line of sight;
    a pair of temples coupled to the frame via a hinge, each of the pair of temples comprises a slider having at least one ridge disposed therein and a slotted tube for variable positioning of the at least one ridge and the slider; and
    a permanently inverted U-shaped plastic saddle coupled to the pair of temples via a harness.

2. The quadruped optical system of claim 1, further comprising: a lens in the frame.

3. The quadruped optical system of claim 1, wherein the saddle is adjustable.

4. The quadruped optical system of claim 1, wherein the frame is made from the same material as the temples, the harness, and the saddle.

5. The quadruped optical system of claim 1, wherein the frame is made from a material that is different from the material used in either of the temples, the harness, or the saddle.

6. The quadruped optical system of claim 5, wherein the frame is made from plastic.

7. The quadruped optical system of claim 5, wherein the saddle is made of plastic.

8. The quadruped optical system of claim 1, wherein the saddle is configured to be coupled to another accessory or body part of the quadruped.

9. A quadruped optical system, comprising:
- a frame configured to contact a nose of the quadruped so as to be located proximal to the eyes of the quadruped; and
- a saddle with a permanently inverted U-shape, the saddle being coupled to the frame via a plurality of permanently U-shaped plastic harness portions, the saddle being configured to lay atop the neck of the quadruped when the frame is located proximal to the eyes of the quadruped and in contact with the nose of the quadruped, wherein the frame is adjustably coupled to the saddle via a pair of temples, each of the pair of temples comprises a slider having at least one ridge disposed therein and a slotted tube for variable positioning of the at least one ridge and the slider.

* * * * *